United States Patent [19]

Schweizer et al.

[11] 3,917,411
[45] Nov. 4, 1975

[54] APPARATUS FOR MEASURING THE DENSITY OF A LIQUID UTILIZING REFRACTION

[75] Inventors: Walter Schweizer; Martin-Ulrich Reissland, both of Berlin, Germany

[73] Assignee: VDO Adolf Schindling AG, Germany

[22] Filed: Sept. 12, 1973

[21] Appl. No.: 396,560

[30] Foreign Application Priority Data
Sept. 26, 1972 Germany............................ 2247048

[52] U.S. Cl. ................................................ 356/135
[51] Int. Cl.² ........................................ G01N 21/46
[58] Field of Search .......... 356/128, 130, 131, 132, 356/133, 134, 135, 136, 138; 250/574

[56] References Cited
UNITED STATES PATENTS
3,362,224   1/1968   Melone ............................... 356/133
3,426,211   2/1969   Anderson ............................ 356/135
3,797,940   3/1974   King ................................... 356/134

Primary Examiner—Vincent P. McGraw
Assistant Examiner—Conrad J. Clark
Attorney, Agent, or Firm—Otto John Munz

[57] ABSTRACT

An apparatus for the continuous measurements of the density of a liquid within prespecified limits, utilizing the law of refraction and particularly suitable for measurements of the acid concentration of a storage battery in a motor vehicle to determine the state of charge of the battery. The apparatus has a lightconductive rod, the end of which, to be immersed in the liquid, is provided with a measuring surface and two deflecting surfaces; a light source emits a pencil of parallel or nearly parallel rays into the rod toward the measuring surface, and a photosensitive element is positioned in the path of rays opposite one of the deflecting surfaces.

2 Claims, 1 Drawing Figure

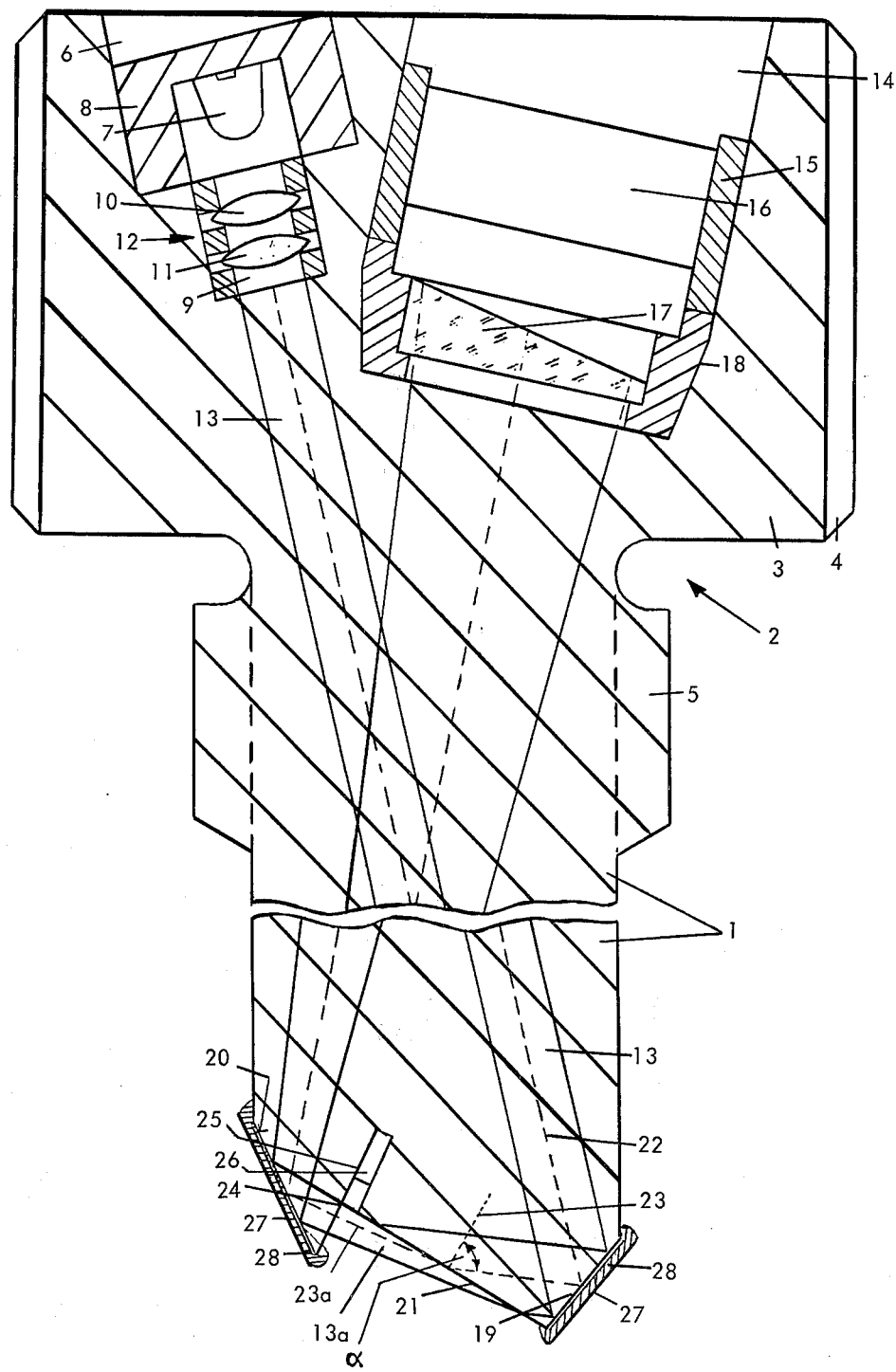

APPARATUS FOR MEASURING THE DENSITY OF A LIQUID UTILIZING REFRACTION

CROSS REFERENCE TO A RELATED APPLICATION

Priority of corresponding German Patent Application No. P 22 47 048.0, filed Sept. 26, 1972 is claimed under the Convention.

BACKGROUND OF THE INVENTION

1. Field of the Invention

An apparatus for measuring the density of a fluid, utilizing its refractive index, as an integral part of a light transmitting rod comprising a source of a pencil of parallel rays, a measuring surface and two deflecting surfaces, means to direct the pencil of rays toward the measuring surface at a predetermined angle, a limiting surface positioned perpendicularly to the path of the bundle of rays, one of the deflecting surfaces positioned behind the limiting surface so that the pencil of rays, refracted by the measuring surface is directed toward the limiting surface. (Class 356-128).

2. Description of the Prior Art

The prior art is represented by U.S. Pat. Nos. 2,483,102 to R. M. Pierson of Sept. 27, 1949 for "Refractometer Employing Photosensitive Devices and Use Of The Same" and 2,569,127 to G. C. Eltenton of Sept. 25, 1951 for "Refractive Index Measurement of Fluids".

For measuring the density of a liquid, an apparatus with a glass rod immersed in the liquid to be measured is already known. The apparatus has at the end of the rod that projects from the liquid a light source emitting a pencil of rays entering parallel to the optical axis of the glass rod. On the immersed end are provided two deflecting surfaces and one measuring surface. The deflecting and measuring surfaces are arranged in such a way that the pencil of rays is guided, via one deflecting surface, to the measuring surface at the angle of the total reflection and therefrom, via a further deflecting surface, to a telescope. Such an apparatus presents the drawback that the density of the liquid can be determined within very narrow limits and in a subjective manner only. Therefore, a continuous measurement of the density cannot be carried out by means of this apparatus.

In another apparatus of the prior art, a lightconductive rod is provided. Its end immersed in the liquid has a front surface perpendicular to the axis of the rod and is provided with a reflecting coat and there are a light source and a photosensitive element on the end that projects from the liquid. In this apparatus, the light rays entering the lightconductive rod are refracted into the liquid more or less in accordance with the density of the liquid, so that the amount of light passing into the liquid is a criterion for the density of the liquid. By this apparatus, a continuous measurement is possible, but care must be taken that the depth of immersion of the lightconductive rod be always be always the same, since otherwise substantial errors of measurement may result. Especially in storage batteries, however, the liquid level varies considerably, so that such an apparatus cannot be used for measuring the acid concentration of a storage battery.

Another apparatus for measuring the acid concentration of a storage battery has become known wherein a pencil of rays emanating from a light source is directed, through a prism filled with the liquid, toward several photosensitive receivers. Depending on the density of the liquid, the pencil of rays is more or less strongly refracted by the prism and strikes therefore, depending on the prevailing refractive index, a photosensitive receiver corresponding to this refractive index. Such an apparatus presents the shortcoming that it is relatively large in volume and cannot be inserted in the storage battery casing without substantial alterations. It also has a complex structure and is therefore expensive.

SUMMARY OF THE INVENTION

The primary object of this invention is to overcome these difficulties and disadvantages of the prior art. The invention aims therefore at creating an apparatus which permits not only a continuous measurement of the density of the liquid, independently of the prevailing liquid level, but has also an inexpensive and simple structure of small volume.

BRIEF DESCRIPTION OF THE DRAWINGS

The only FIGURE of the drawings is a schematic cross-sectional vertical view of the apparatus of the invention.

DESCRIPTION OF THE PREFERRED EMBODIMENTS

According to the invention, deficiencies of the prior art are remedied by providing an apparatus provided with a light source directing a pencil of rays toward the measuring surface at an angle to a line perpendicular to the measuring surface, which equals, at most, the angle of total reflection occurring at the lowest liquid density limit. The pencil of rays is refracted thereby into the liquid toward a limiting surface of the rod which is preferably perpendicular to the axis of the pencil of rays and behind which is provided at least one deflecting surface.

Since the refraction of the pencil of rays into the liquid takes place as a function of the density thereof, and the reentry of the pencil of rays via the limiting surface into the rod takes place only at a certain freely selectable point of the rod, the measurement of the density is independent of the prevailing liquid level when this point is positioned below the occuring minimum liquid level. Such an apparatus is manufactured inexpensively in a most compact form, with a small amount of structural elements and is excellently suitable for use as an acid concentration measuring apparatus for storage batteries.

In a preferred embodiment, the measuring surface is arranged on the front side of the rod. This arrangement is superior to the likewise possible arrangements of the measuring surface on or in the lateral wall of the rod, because the rod section positioned below the liquid level can be kept short and thus the total structural length is particularly small. It has proved to be better to arrange one of the deflecting surfaces in the path of the rays in front of the measuring surface, and the other behind the limiting surface. Thereby the structure became particularly compact and easy to manufacture in comparison with an arrangement in accordance with which both deflecting surfaces are behind or in front of the limiting surface. In order to prevent a disturbance of the path of rays in the space between the measuring surface and the limiting surface by rising gas bubbles or by particles slowly floating upwards in the liquid, or the like, which are caught or stick in this space between the measuring surface and the limiting surface, a groove with a slanting base has been provided. In an embodiment preferred for reasons of more efficient manufacturing, the limiting surface and a lateral wall of the groove are situated in one plane and the groove base slants from the middle toward the ends.

The light source comprises advantageously a gallium arsenide diode with an optical system arranged in front thereof and producing a pencil of parallel rays. By the employment of a gallium arsenide diode the structural volume can be kept particularly small. Moreover, a gallium arsenide diode, in contrast to an incandescent lamp, operated at low voltage, has a lower power requirement and a longer life. The optical system preferably has two conventional successive convergent lenses or one condenser lens molded to the rod end. The light source is provided adjacent thereto.

As a photosensitive element a photoelement, a photodiode, or a photoresistance cell can be used. The latter is particularly advantageous with relation to photosensitivity and cost. Since the pencil of rays which strikes the active surface of the photosensitive element travels over this surface in dependence on the liquid density, while, however, the total luminous flux of the pencil of rays remains constant, only slight variations in the electric circuit of the photosensitive element result. In a further concept of the invention, these variations can be substantially increased by providing a filter wedge in the path of rays at a space in front of the photosensitive element. With such a filter wedge, the transmission degree varies depending on the place, so that, depending on the position of the pencil of rays, the fraction of light received by the photosensitive element varies. Beyond this, the filter wedge presents the advantage that by suitable shaping of the wedge the indication characteristic can be altered within wide limits. Furthermore, it has proved particularly practical to roughen the side of the filter wedge which faces the photosensitive element. Thereby the active surface of the element is largely irradiated in a diffuse manner, and consequently spots of different sensitivity of the active surface of the element cannot affect the result of measurement. As another possibility, to achieve wide variations in the electric circuit of the photosensitive element, instead of a filter wedge a polarization filter is mounted in the space in front of the photosensitive element in such a way that a line perpendicular to its surface encloses with the entering pencil of rays the Brewster angle.

In order to improve the reflection properties of the deflection surfaces, the latter are most suitably provided with a reflecting layer which is separated from the liquid by a protective coat. In an apparatus for measuring the acid concentration of a storage battery, e.g., bitumen may be employed as such a protective coat. The reflecting layer may consist of silver, alumium or, which is more advantageous, of gold, since a gold layer, in connection with a gallium arsenide diode, or an incandescent lamp operated at low tension voltage, has the advantage that the spectrum of light emanating from such a light source has an extremely high degree of reflection.

In a preferred embodiment of the invention for use in a storage battery, the upper end of the light conductive rod is positioned on a battery closure plug in whose head the light source and the photosensitive element are arranged, in case together with the filter. Such a structure of the apparatus does not require any structural changes on the battery casing, nor additional means for fastening the apparatus to the battery casing. Thus the mounting of the apparatus on the battery casing can be carried out by untrained personnel including the vehicle driver. The apparatus of this embodiment is therefore excellently suitable for the supplemental equipment of storage batteries already being in motor vehicle.

A screw or plug connection is used for the fastening of the lightconductive rod on the battery closure plug. With a screw connection the rod is provided, on the end facing away from the measuring surface, with an outside screw thread, and the closure plug with a corresponding inside screw thread. However, it has proved particularly practical to construct the lightconductive rod and the battery closure plug integrally as a one-part plastic unit. This results in substantial advantages with relations to an efficient manufacture since such a structural part can be manufactured in a single operation by injection molding or a pressing process.

As is known, the concentration of the acid in a storage battery as well as the density of the liquids depends on its temperature, in that it decreases at a rising temperature. Since, however, the viscosity of the acid likewise decreases at rising temperature and this effect outweighs the other one, the available charge of the battery is higher at increasing temperatures, notwithstanding the decreasing concentration of the acid.

According to a further concept of the invention, this dependence can be taken into consideration by providing a thermometer probe on or in the portion of the lightconductive rod that is immersed in the liquid, and by feeding the output signal of this thermometer prove as a corrective value to the indicating current circuit.

While the invention is not limited thereto, the apparatus shown in the drawing for purposes of an operable example is specifically developed for measuring the acid concentration in a lead storage battery. It contains a lightconductive rod 1 which at one end changes over into an element 2 shaped as a battery closure plug and forms therewith a one-part unit of polymethyl methacrylate. The closure plug section 2 comprises a head 3 whose periphery is provided with a milled edge 4, and a thread section 5.

In the closure plug section 2 there are provided a first bore 6 for holding a gallium arsenide diode 7 of the light source and a second bore 9, concentrical to bore 6. The diode is positioned in a mounting support 8 that is displaceable in the direction of the longitudinal axis. 12 of two converging lenses 10 and 11, for producing a pencil of parallel rays 13 is arranged in the second bore 9. A photoresistance cell 16, which serves as the photosensitive element, being in a socket 15 is mounted in a further bore 14, and a wedge filter 17 mounted in a socket 18, is positioned spaced from the active surface of the photoresistance cell 16. The photoresistance cell 16 is arranged directly or indirectly via an operation amplifier in the indicating current circuit of the measuring apparatus.

At the free end of the lightconductive rod 1 are two deflecting surfaces 19 and 20, one of which is located in the path of rays in front of (i.e. upbeam of) the measuring surface 21. It reflects the pencil of rays 13 toward the measuring surface 21 to strike with its longitudinal axis 22 the measuring surface at an angle with a line 23, perpendicular to the measuring surface, which equals the angle of the total reflection occurring at the lowest limit of acid concentration. A starter battery for a motor vehicle designed for Central Europe has the lowest acid concentration limit amounting approximately to 1.18 kg/l. It occurs when the lead storage battery is discharged. A refractive index of the acid of about 1.3642 corresponds to this value, so than an angle of total reflection of about 65 degrees results at a refractive index of the light conductive rod 1 of polymethyl methacrylate of approximately 1.49. The aforementioned values apply at a temperature of 20°C.

The other deflecting surface 20 is positioned in the path of rays behind (i.e. downbeam of) a limiting surface 24 which runs perpendicularly to the longitudinal axis 23a of the pencil of rays 13a, refracted into the acid. The pencil of rays 13a entering through limiting surface 24 is deflected by the deflecting surface 20 via a wedge filter 17, toward the photoconductive cell 16. In order to prevent rising gas bubbles from sticking in the space between the measuring surface 21 and the limiting surface 24 and thus from disturbing the path of rays, a groove 25 is provided between the two surfaces. A lateral wall of the groove 25 is positioned in one plane with limiting surface 24. The groove base 26 slants from the middle toward the groove ends.

To improve the reflection properties, a gold layer 27 is applied to each of the two deflecting surfaces 19 and 20, and a bitumen layer 28 is provided above this gold layer.

What is claimed is:

1. An apparatus for continuous measurement of the density of a liquid within prespecified limits by using the law of refraction, the apparatus being particular suitable for measurement of the electrolyte concentration in a storage battery of a motor vehicle to determine its charge, the apparatus comprising:
    A. a light-conductive rod having one end for immersion in said liquid and a second end for handling, the rod being adapted to conduct a pencil of rays along a beam path, the rod further comprising:
       A1. a measuring surface arranged on said one end of the rod,
       A2. a limiting surface on said one end and positioned substantially perpendicularly to said beam path,
       A3. two deflecting surfaces provided on said one end, one of the deflecting surfaces being positioned in the beam path upbeam of the measuring surface and the other deflecting surface being positioned in the beam path downbeam of the limiting surface, and
       A4. a groove with a slanting base between the measuring surface and the limiting surface,
    B. a light source for emitting said pencil of substantially parallel rays as a beam along said beam path, the light source being situated at said second end of the rod for directing the beam toward the measuring surface via said one of the deflecting surfaces, whereby the beam is adapted, when the measuring surface is immersed in the liquid, to be refracted by the measuring surface into the liquid by an amount dependent upon the density of the liquid and then to be directed toward the limiting surface, after which it strikes and is deflected by said other deflecting surface, and
    C. a photosensitive element situated at said second end and placed to intercept the beam which is deflected by said other deflecting surface, whereby the direction of the beam toward the photosensitive element is varied as a function of the density of the liquid.

2. An apparatus for continuous measurements of the density of a liquid, utilizing refraction, as claimed in claim 1, the said limiting surface and one lateral wall of the groove being positioned in one plane and the base of said groove base slanting from the middle toward the ends.

* * * * *